US009140275B2

(12) United States Patent
Dengler

(10) Patent No.: US 9,140,275 B2
(45) Date of Patent: Sep. 22, 2015

(54) HYDRAULIC DRIVE AND METHOD FOR CONTROLLING SUCH A HYDRAULIC DRIVE

(75) Inventor: Peter Dengler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 470 days.

(21) Appl. No.: 13/582,094

(22) PCT Filed: Dec. 29, 2010

(86) PCT No.: PCT/EP2010/007968
§ 371 (c)(1),
(2), (4) Date: Nov. 12, 2012

(87) PCT Pub. No.: WO2011/107135
PCT Pub. Date: Sep. 9, 2011

(65) Prior Publication Data
US 2013/0213024 A1 Aug. 22, 2013

(30) Foreign Application Priority Data

Mar. 1, 2010 (DE) .......................... 10 2010 009 704

(51) Int. Cl.
*F15B 11/16* (2006.01)
*F16H 61/4061* (2010.01)
(Continued)

(52) U.S. Cl.
CPC ................ *F15B 11/16* (2013.01); *B60K 17/14* (2013.01); *F15B 11/163* (2013.01); *F15B 11/165* (2013.01); *F16H 61/4061* (2013.01); *F16H 61/4078* (2013.01); *F16H 61/4148* (2013.01); *F16H 61/4192* (2013.01); *F16H 61/421* (2013.01); *F16H 61/456* (2013.01); *F16H 61/47* (2013.01); *F15B 2211/20546* (2013.01); *F15B 2211/253* (2013.01);
(Continued)

(58) Field of Classification Search
CPC ...... F15B 11/16; F15B 11/163; F15B 11/165; F15B 2211/20546; F15B 2211/253; F15B 2211/30555; F15B 2211/7058; F15B 2211/7128; F16H 61/4061; F16H 61/4078; F16H 61/4148; F16H 61/4192; F16H 61/421; F16H 61/456; F16H 61/47; B60K 17/14
USPC .................................. 60/484, 486, 491, 490
See application file for complete search history.

(56) References Cited

U.S. PATENT DOCUMENTS

| 4,177,870 A * | 12/1979 | Henn ............................... 60/484 |
| 5,331,812 A * | 7/1994 | Imai ................................ 60/452 |
| 6,857,494 B2 * | 2/2005 | Kobayashi et al. ........... 180/243 |
| 7,290,390 B2 * | 11/2007 | Kim ................................. 60/484 |
| 8,356,479 B2 * | 1/2013 | Essig .............................. 60/484 |

FOREIGN PATENT DOCUMENTS

| DE | 43 25 703 A1 | 2/1995 |
| DE | 10 2006 002 920 A1 | 7/2007 |

(Continued)

OTHER PUBLICATIONS

International Search Report corresponding to PCT Application No. PCT/EP2010/007968, mailed Feb. 23, 2011 (German and English language document) (7 pages).

*Primary Examiner* — Thomas E Lazo
(74) *Attorney, Agent, or Firm* — Maginot, Moore & Beck LLP

(57) ABSTRACT

A hydraulic drive and method for controlling such a drive includes two drive motors configured to be controlled by at least one continuously adjustable distribution valve. The two drive motors are configured as adjustable hydraulic machines.

20 Claims, 4 Drawing Sheets

(51) Int. Cl.
*F16H 61/4078* (2010.01)
*F16H 61/4148* (2010.01)
*F16H 61/4192* (2010.01)
*F16H 61/421* (2010.01)
*F16H 61/456* (2010.01)
*F16H 61/47* (2010.01)
*B60K 17/14* (2006.01)

(52) U.S. Cl.
CPC ............... *F15B 2211/30555* (2013.01); *F15B 2211/7058* (2013.01); *F15B 2211/7128* (2013.01)

(56) References Cited

FOREIGN PATENT DOCUMENTS

| | | |
|---|---|---|
| DE | 10 2006 053 925 A1 | 5/2008 |
| EP | 1 279 870 A1 | 1/2003 |
| EP | 1 676 964 A2 | 7/2006 |
| GB | 956396 | 4/1964 |
| JP | 2-17267 A | 1/1990 |
| JP | 02017267 A * | 1/1990 |
| JP | 9-125464 A | 5/1997 |

* cited by examiner

HYDRAULIC DRIVE AND METHOD FOR CONTROLLING SUCH A HYDRAULIC DRIVE

This application is a 35 U.S.C. §371 National Stage Application of PCT/EP2010/007968, filed on Dec. 29, 2010, which claims the benefit of priority to Serial No. DE 10 2010 009 704.7, filed on Mar. 1, 2010 in Germany, the disclosures of which are incorporated herein by reference in their entirety.

BACKGROUND

The disclosure relates to a hydraulic drive and to a method for controlling a drive.

Hydraulic drives of this type are implemented in the case of mobile working implements, for example compact and mini diggers, in which each wheel or each chain is assigned a hydraulic motor, which hydraulic motors are individually controllable in order to change the movement parameters, for example the direction of travel and the drive speed.

DE 43 25 703 A1 discloses a hydrostatic drive, in which hydraulic motors assigned to each wheel of a wheeled vehicle are hydraulically connected via continuously adjustable directional control valves to a pump assigned to the two hydraulic motors. Said pump is designed as an axial piston pump which is pivotable about zero, wherein the volumetric flow of pressure medium and the direction of flow of the pressure medium to the respectively assigned hydraulic machine is settable by individual control of the continuously adjustable directional control valves.

A drive of this type may be used, for example, in a hydraulic system of a mobile working implement, in which, in addition to the hydrostatic drive, all or some working functions are also supplied via the variable displacement pump. Hydraulic control arrangements of this type are designed as an LUDV system, as described, for example, in DE 10 2006 002 920 A1 belonging to the applicant. In this case, a continuously adjustable directional control valve with an LUDV pressure balance connected downstream is assigned in each case to each working function, for example to differential cylinders for adjusting a boom, a leg, a shovel or a hydraulic motor for adjusting the slewing gear. Said LUDV pressure balance is acted upon by the maximum load pressure of all of the consumers, with the effect of reducing a throttle cross section, and by the pressure downstream of a metering diaphragm, which is formed by the assigned directional control valve, with the effect of increasing a throttle cross section. In the regulating position of each LUDV pressure balance, the pressure in the pressure medium flow path between the assigned metering diaphragm and the respective LUDV pressure balance corresponds to the maximum load pressure which is then throttled via said LUDV pressure balance to the individual load pressure of the particular consumer. Via said LUDV pressure balance, the pressure drop across the metering diaphragms is kept constant irrespective of the load pressure, wherein, in the event of a saturation deficit, the volumetric flow of pressure medium to all of the controlled consumers of a circuit is reduced by the same ratio. In this case, the variable displacement pump is preferably likewise controlled depending on the maximum load pressure of all of the connected consumers such that the pump pressure is at a predetermined pressure differential above said maximum load pressure.

During cornering, the load moment at the hydraulic motor on the outside of the curve rises and correspondingly drops at the hydraulic motor on the inside of the curve. The resulting large pressure difference is compensated for by the LUDV pressure balance of the directional control valve which supplies the drive motor on the inside of the curve. High hydraulic losses occur and the power regulator of the variable displacement pump may reduce the volumetric flow because of the high pressure load on the drive motor on the outside of the curve, which leads to a significant reduction in the cornering speed. A further disadvantage of conventional solutions of this type consists in that, due to manufacturing tolerances, the maximum volumetric flows of pressure medium to the two drive motors cannot be set precisely to the same value, and therefore additional measures have to be taken in order to assist straight line stability.

In the publication "Hydrostatische Antriebe mit Sekundärregelung [Hydrostatic drives with secondary regulation]", Der Hydraulik-trainer volume 6; Vogel-Buchverlag, Wurzburg, 1989, a drive for a dipper dredger with secondary regulation is shown, wherein each drive and the additional working functions are supplied with pressure medium via a variable displacement pump arrangement, and each chain of the dipper dredger is assigned two adjustable drive motors. The system is implemented with secondary regulation, in which the rotational speed regulated drive motors are connected to a pressure network and are therefore charged with an impressed pressure. That is to say, in this solution, the rotational speed of the drive motors is regulated in such a manner that said rotational speed is achieved with the impressed network pressure irrespective of the respective load pressure.

A secondary regulation of this type requires a considerable outlay in terms of regulation technology. A further disadvantage of this known solution is that, if the regulating unit breaks down, the drive motors break down, and therefore the mobile working implement is only able still to be moved with great difficulty.

By contrast, it is the object of the disclosure to provide a simply constructed hydrostatic drive which is operable with low hydraulic losses and has improved operational reliability. It is furthermore the object of the disclosure to provide a method for controlling such a hydrostatic drive.

SUMMARY

This object is achieved with regard to the hydrostatic drive and with regard to the method by the features of the disclosure.

Advantageous developments of the disclosure are the subject matter of the dependent claims.

According to the disclosure, the hydraulic drive is realized with at least two drive motors and at least one directional control valve which is continuously adjustable in order to set movement parameters and via which the supply of pressure medium to and removal of pressure medium from the drive motors is settable depending on the actuation of an adjusting member, for example a joystick, or foot pedals or the like. According to the disclosure, the two hydraulic motors are of adjustable design and are controllable via a control unit depending on the actuation of the adjusting member.

Accordingly, a type of mixed solution is involved, in which the advantages of the conventional solution described at the beginning, with control of the supply and removal of pressure medium via a directional control valve, are combined with the advantages of a secondary regulation, in which the hydraulic motors of the drive are of adjustable design. Such a solution therefore makes it possible to influence the supply of pressure medium to the hydraulic machines via the directional control valve and to undertake possible corrections by adjusting the hydraulic motors.

This variability is used in the method according to the disclosure. In said method, the desired values for the drive motors are first of all set via the adjusting member referred to, and adjusting signals for the at least one directional control valve are determined from the desired values, and a desired rotational speed ratio is calculated from said adjusting signals via a control unit. In a further method step, said desired rotational speed ratio is compared with the actual rotational speed ratio of the drive motors and, depending on the result of said comparison, the drive motors are adjusted until the desired rotational speed ratio is reached. This ensures that a desired movement state, for example an exact straight line travel or cornering at a predetermined cornering speed can be maintained even under unfavorable operating conditions. A further advantage resides in the fact that, in the event of a breakdown of the electronic control for the drive motors, adjustment of the directional control valve ensures at least a slow forward or rearward travel of the mobile working implement in order to move the latter out of a hazardous area.

In a preferred exemplary embodiment of the disclosure, the continuously adjustable directional control valve is assigned an LUDV pressure balance via which the volumetric flow of pressure medium through the directional control valve can be kept constant irrespective of the load pressure.

In a simply constructed alternative, a single directional control valve is assigned to the two drive motors. According to the disclosure, it is preferred if the continuously adjustable directional control valve or valves is or are actuated depending on the control unit via which the drive motors are also controlled. In one exemplary embodiment, each drive motor is assigned a continuously adjustable directional control valve of the design described above, and therefore, in the event of the control electronics for the drive motors breaking down, the functionality of a conventional system is maintained, and therefore the mobile working implement is maneuverable further. In this case, it may be advantageous to provide a pressure-compensating diaphragm in the outlet lines from the drive motors, said pressure-compensating diaphragm improving the straight line stability irrespective of the control of the drive motors.

In one exemplary embodiment of the disclosure, each drive motor is assigned a dedicated adjusting member.

Said adjusting member may be designed as an electronic adjusting member (drive by wire). In principle, however, a hydraulic adjusting member is also usable, the adjustment of which is detected via suitable sensors and converted into control signals for the control unit.

The driving safety is further improved if, in a basic position, the drive motors are set in the direction of the maximum absorption volume.

In order to detect the actual state, use is preferably made of rotational speed sensors.

The control for the described drive is preferably designed as a directional control valve section of a mobile control block, via the other directional control valve sections of which the further working functions of the mobile working implement are controllable.

BRIEF DESCRIPTION OF THE DRAWINGS

Preferred exemplary embodiments of the disclosure are explained in more detail below with reference to schematic drawings, in which.

DETAILED DESCRIPTION

Figure 1:
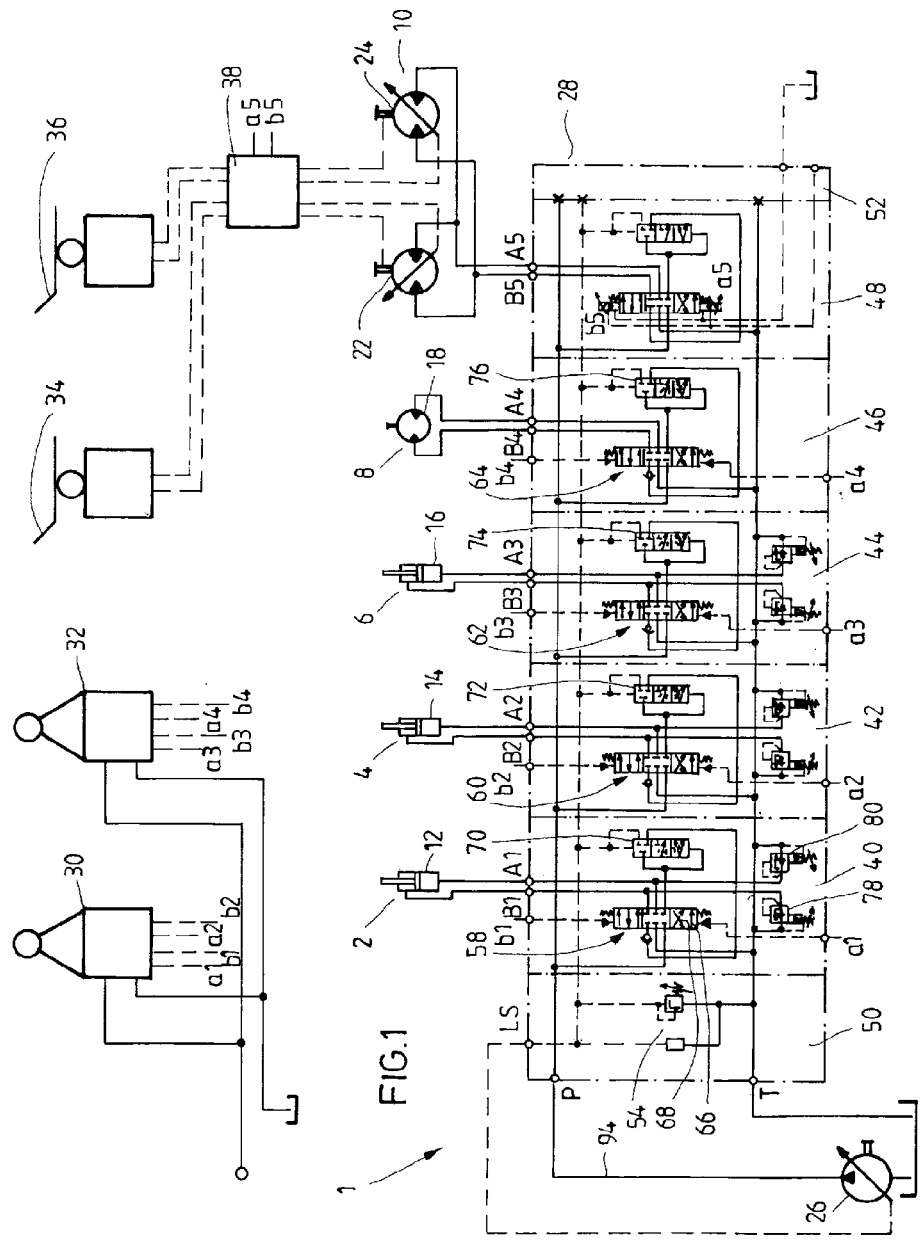
FIG. 1 shows a circuit diagram of a hydraulic control arrangement of a mobile working implement.

FIG. 1 shows a circuit diagram of a hydraulic control arrangement 1 of a compact digger for actuating a boom 2, a leg 4, a shovel 6, a slewing gear 8 and a drive 10. The boom 2, the leg 4 and the shovel 6 are each actuated via a differential cylinder 12, 14, 16. The slewing gear 8 has a hydraulic motor 18, and the drive 10 is implemented with differential speed steering, in which respective drive motors 20, 22 are assigned to a left-hand and a right-hand chain. Said hydraulic units are supplied with pressure medium via a variable displacement pump 26 which is settable via an LS regulating valve (not illustrated) depending on the maximum load pressure of the activated consumers in such a manner that the pump pressure lies above said maximum load pressure by a predetermined $\Delta p$. Instead of a variable displacement pump 26, use may also be made of a constant pump with an assigned LS pressure balance, via which excess flow delivered by the pump flows off toward the tank.

The supply of pressure medium to and from the consumers is controlled via a mobile control block 28, the directional control valves of which (described in more detail below) are controlled via suitable adjusting members, for example via joysticks 30, 32 (illustrated in FIG. 1), wherein the joystick 30 is assigned to the boom 2 and the leg 4, and the joystick 32 is assigned to the shovel 6 and the slewing gear 8. Via each joystick 30, 32, a hydraulic pilot control unit with pressure reducing valves is actuated, via which a control pressure provided by a control pressure source is reduced to a differential control pressure in order to actuate the regulating valves concerned. The construction of such hydraulic control units is known, and therefore further explanations are unnecessary.

The drive motors 22, 24 are controlled via respective electronic foot pedals 34, 36, the control signals of which are converted via a control unit 38 into corresponding adjusting signals for the drive.

The mobile control block 28 has a basic construction, as described in DE 10 2006 002 920 A1 mentioned at the beginning, and consists of a multiplicity of valve disks, called directional control valve sections 40, 42, 44, 46, 48 here, an input element 50 and an output element 52. The directional control valve sections 40, 42, 44 are assigned to the differential cylinders 12, 14, 16, the directional control valve section 46 is assigned to the hydraulic motor 18 and the directional control valve 48 is assigned to the drive 10. The input element 50 has an LS connection via which the load pressure for adjusting the LS pump 26 is tapped off.

The input element 50 is provided with an LS pressure release valve arrangement 54 via which the LS pressure is limitable and can be dissipated toward a tank T by means of an orifice. Furthermore, a pressure connection P which is connected to the delivery connection of the variable displacement pump 26, and a tank connection T which is connected to a tank 56 are formed at the input element 50. Each directional control valve section 40, 42, 44 has two working connections A, B which are connected to the corresponding pressure spaces of the differential cylinders 12, 14, 16, and, furthermore, two control connections A, B which are connected to the output connections of the above-described pilot control units, and therefore the respective differential control pressure can be applied.

The mobile control block 28 is designed as an LUDV control block, wherein each directional control valve section 40, 42, 44, 46 is realized with a continuously adjustable directional control valve 58, 60, 62, 64. Each of said directional control valves 58, 60, 62, 64 has a speed part formed by a metering diaphragm 66 and a directional part 68 for setting the direction of flow of the pressure medium to and from the assigned consumer 12, 14, 16, 18. For the sake of clarity, only the directional part 68 and the metering diaphragm 66 of the directional control valve 58 of the directional control valve section 40 are indicated in FIG. 1. With regard to the specific construction of such directional control valves, reference is made by way of example to DE 10 2006 002 920 A1 or to corresponding LUDV solutions.

An LUDV pressure balance 70, 72, 74, 76 is arranged downstream of each metering diaphragm 66, said LUDV pressure balance being acted upon in the closing direction by the maximum load pressure of all of the activated consumers, which load pressure is tapped off via a cascade of shuttle valves (not illustrated). The pressure downstream of the assigned metering diaphragm 66 acts in each case on the LUDV pressure balance 70, 72, 74, 76 in the opening direction. As explained at the beginning, the maximum load pressure present downstream of the metering diaphragm 66 is throttled via the LUDV pressure balance 70, 72, 74, 76 to the individual load pressure of the respectively assigned consumer 12, 14, 16, 18. Depending on the setting of the directional part 68, pressure medium then flows from the assigned LUDV pressure balance 70, 72, 74, 76 to the assigned working connection A, B such that the corresponding consumer is moved or activated at a predetermined speed in a predetermined direction.

In order to avoid cavitations during a pulling load, the directional control valve sections 40, 42, 44 are also provided with replenishing valves 78, 80 which are assigned to each working line, have a pressure-limiting function and via which, during the pulling load, the emerging pressure space is connectable to the tank such that pressure medium can be replenished. The pressure in the respective working lines is also limited to a maximum pressure via said replenishing valves 78, 80. The construction of such replenishing valves is likewise known, and therefore further explanations are unnecessary.

The construction of the directional control valve section 48 assigned to the drive 10 is explained with reference to the enlarged illustration in FIG. 2. This directional control valve section 48 is also provided with a continuously adjustable directional control valve 82 which has a speed part formed by a metering diaphragm 84 and a directional part 86 for setting the direction of flow of the pressure medium to the connections B5, A5.

An LUDV pressure balance 88 is in turn provided downstream of the metering diaphragm 84, said LUDV pressure balance being acted upon in the closing direction by the maximum load pressure from the consumers, which load pressure is present in an LS line 90, and in the opening direction by the pressure downstream of the metering diaphragm 84, said pressure being tapped off by a connecting channel 92 forming a pressure medium flow path between the metering diaphragm 84 and the LUDV pressure balance 88.

Figure 2:
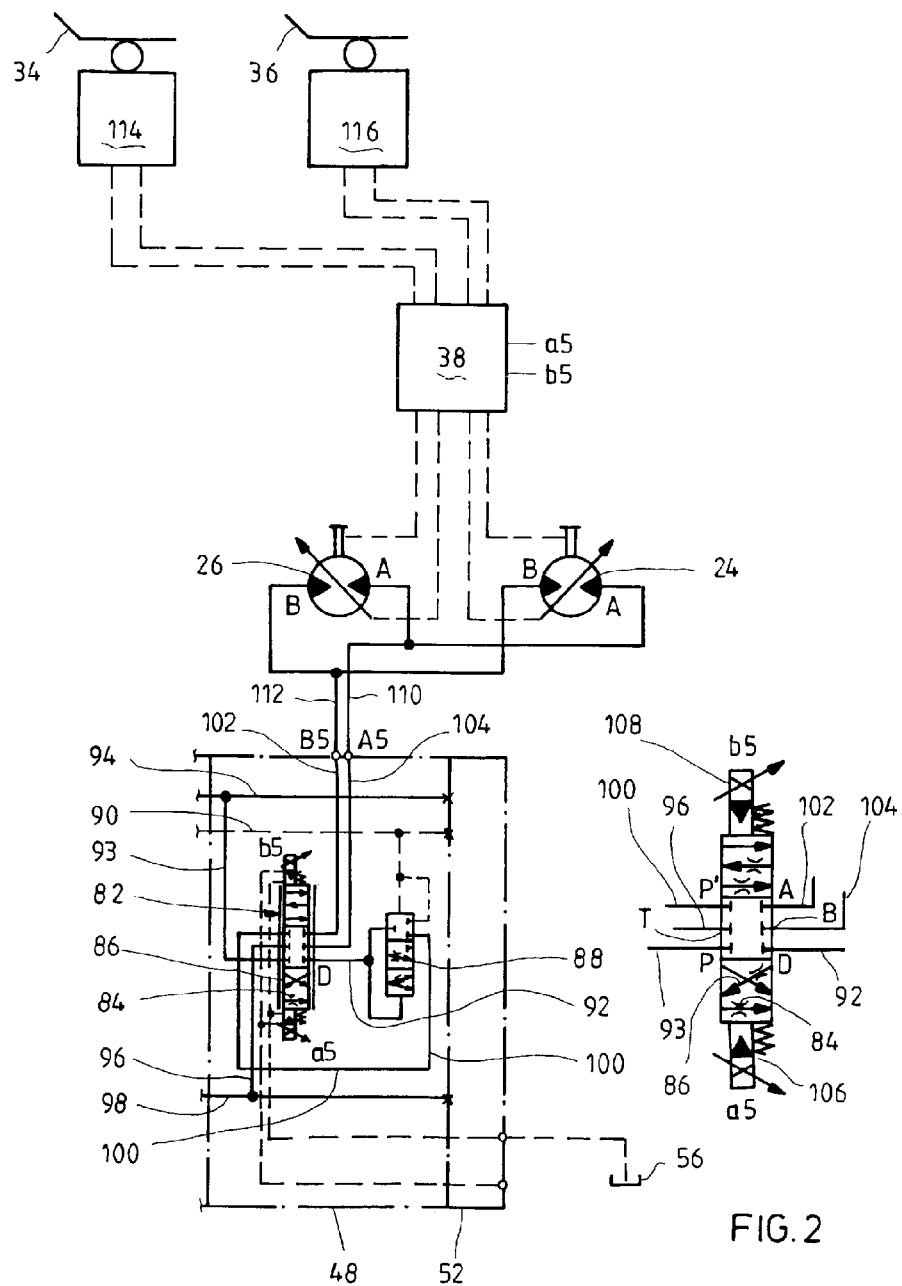
FIG. 2 shows a hydraulic drive of the control arrangement from FIG. 1.

As is clear from the switching symbol, which is shown at the bottom right in FIG. 2, of the directional control valve 82, the input connection P of the latter is connected to an inlet line 93 which is connected to a pump line 94 connected to the delivery connection of the variable displacement pump 26. A tank connection T of the directional control valve 82 is connected via an outlet channel 96 to a tank line 98 leading to the tank 56. The output of the LUDV pressure balance 88 is connected via a pressure balance channel 100 to an input P' of the directional part while the connecting channel 92 connects the input of the LUDV pressure balance 88 to a pressure balance connection D of the directional control valve 82. The two working connections A5, B5 are connected via lines 102, 104 to output connections A, B of the directional control valve 82. Said lines 102, 104 act as feed and return lines, depending on the setting of the directional part 86.

In order to actuate the directional control valve 82, two pressure-reducing valves 106, 108 are provided, the input connections of which are connected to the control oil supply mentioned and which are controlled via the control unit 38 in order to apply a predetermined differential control pressure (a5-b5) to the control sides of the directional control valve 82. As indicated in FIG. 2, the outputs of the pressure-reducing valves 106, 108 are connected to the tank 56.

The two drive motors 24, 26 are designed as hydraulic machines which are pivottable above zero and the pivoting angle of which is adjustable via the control unit 38. The two drive motors 24, 26 are connected in parallel, wherein one working connection A is connected in each case via a branching working line 110 to the connection A5 of the directional control valve section 48 and connections B are connected via a further branching working line 112 to the connection B5 of the directional control valve section 48. The actuation of the foot pedals 34, 36 is detected electronically via transducers 114, 116 and communicated to the control unit 38 by means of signal lines. Said control unit converts said desired values into adjusting signals for adjusting the directional control valve 82.

In the case of the solution according to the disclosure, the direction of flow of the pressure medium and the volumetric flow of pressure medium are therefore preset via the directional control valve 82, wherein, by means of appropriate control of the drive motors 24, 26, retrospective adjustment/change of said parameters (direction of flow, volumetric flow of pressure medium) can take place such that the movement parameters of the drive can be set very exactly.

Figure 3:
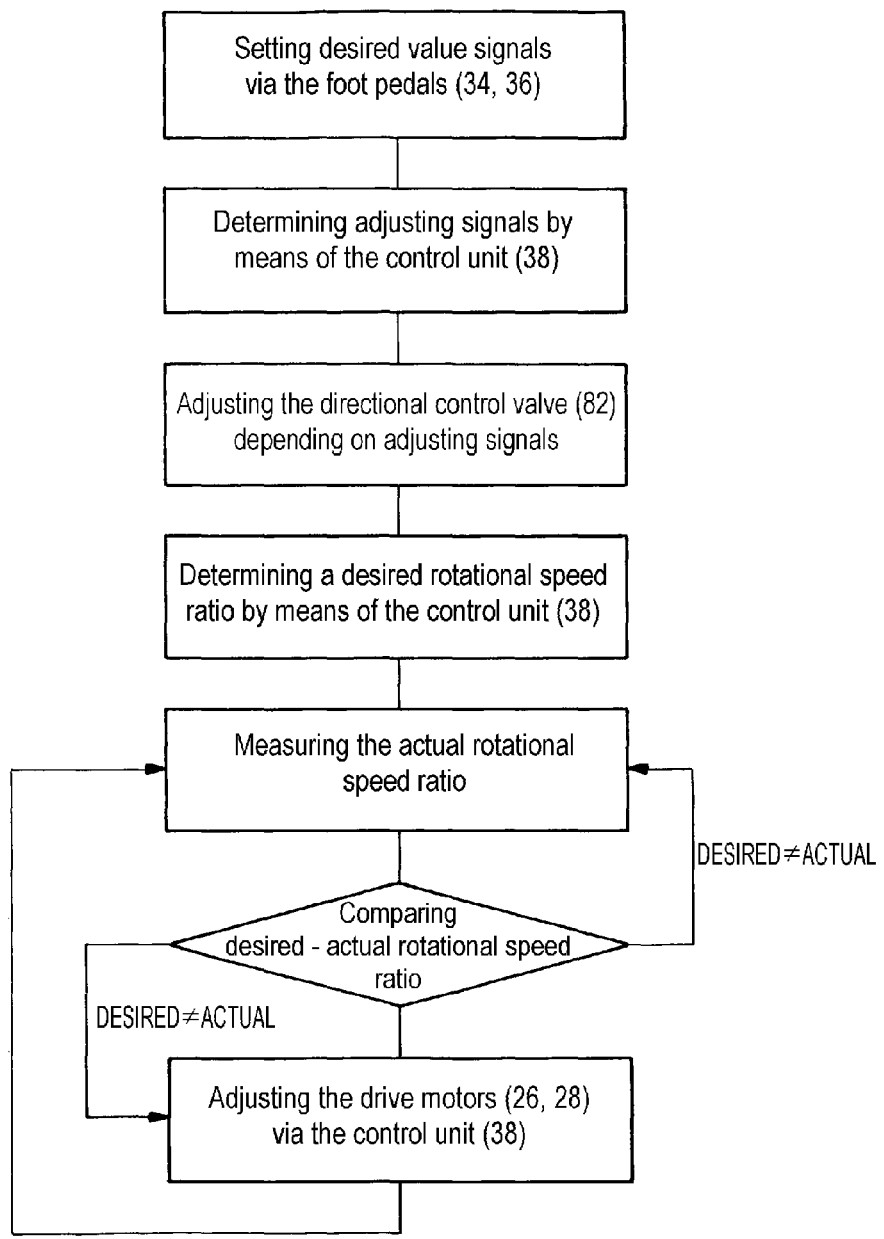
FIG. 3 shows a sequence diagram of the control of the drive.

The functioning of the drive according to the disclosure is explained with reference to the greatly simplified sequence diagram according to FIG. 3.

The two drive motors 24, 26 are preset to the maximum pivoting angle thereof and therefore to the maximum absorption volume. The operator first of all inputs the desired cornering speed and the cornering profile by actuation of the driving pedals 34, 36. From said electronic desired value signals, the control unit 38 determines adjusting signals for the directional control valve such that the latter is acted upon with a differential control pressure (a5-b5) and the metering diaphragm 84 and the directional part 86 are correspondingly set.

Furthermore, a desired rotational speed ratio of the two drive motors 24, 26 is determined from the adjusting signals via the control unit 38 and said desired rotational speed ratio is compared with the actual rotational speed ratio of the drive motors 24, 26. Said actual rotational speeds can be detected, for example, via rotational speed transducers (not illustrated) or the like.

In a subsequent method step, the actual values are compared with the desired values. In the case in which the actual rotational speed ratio corresponds to the desired rotational speed ratio, the drive motors 24, 26 are set corresponding to the desired value signals, and the mobile working implement moves along the predetermined movement curve. In the case in which the actual rotational speed ratio differs from the specification, the two drive motors 26, 28 are adjusted via the control unit and then, in turn, the actual rotational speed ratio which then arises is compared with the preset desired rotational speed ratio—this comparison takes place until the actual rotational speed ratio corresponds to the desired rotational speed ratio.

That is to say, in the event of a deviation of the rotational speed ratios, the control unit 38 corrects the "more rapid" drive motor 24, 26 by the latter being pivoted back until the rotational speed ratio predetermined by the operator is achieved. Each curve radius can therefore be predetermined by the desired value ratios between 0 and 1, wherein the value 0 corresponds to a rotation about a stationary chain and the value 1 to straight line travel. Furthermore, the specification of negative desired rotational speed ratios to −1 permits counter rotation of the chains, and therefore the vehicle can be rotated on site—corresponding to the predetermined speed ratios. This is then made possible by a motor pivoting back via 0 into the negative range.

In the case of the exemplary embodiment explained with reference to FIGS. 1 and 2, the two drive motors 24, are assigned a common directional control valve section 48, and the foot pedals 34, 36 are designed as what are referred to as electronic foot pedals, wherein the actuation of the latter generates desired value signals for the control unit 38.

Figure 4:
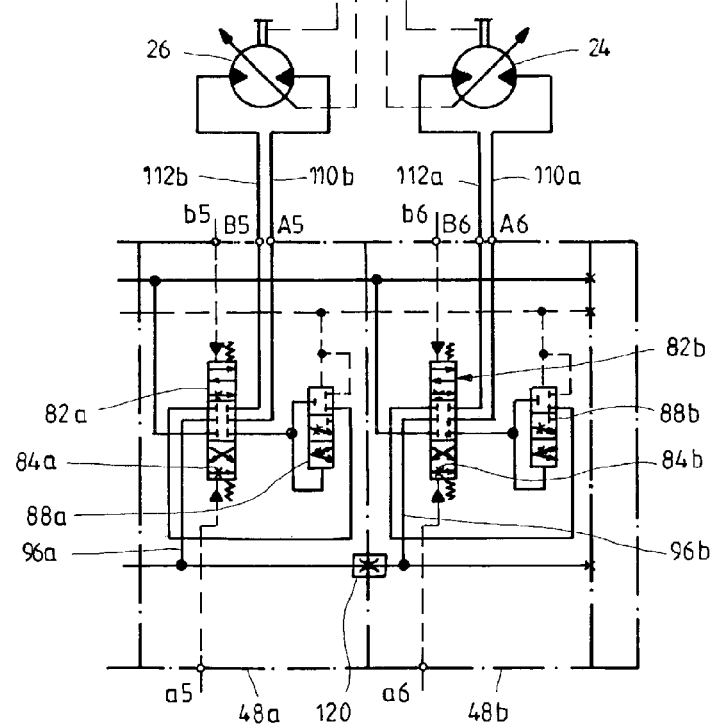
FIG. 4 shows an alternative of a drive for a hydraulic control arrangement according to FIG. 1.

FIG. 4 shows an alternative in which—in a similar manner as in the conventional solutions described at the beginning—each drive motor 24, 26 is assigned a directional control valve section 48a, 48b, the basic construction of which corresponds to the directional control valve section 48 according to FIG. 2, and therefore, by reference to these embodiments, a detailed description can be omitted. One difference over the common directional control valve section 48 is that the two directional control valves 82a, 82b are not directly designed to have pressure-reducing valves but that the adjustment is undertaken hydraulically via pilot control units 114, 116 which generate a differential control pressure a5-b5 and a6-b6, respectively, depending on the actuation of the foot pedals 34, 36. Said differential control pressure is applied to the corresponding directional control valves 82a, 82b via corresponding control connections a5, b5, a6, b6. Each directional control valve section 48a, 48b has dedicated working connections A5, B5 and A6, B6 which are connected via working lines 110a, 112a and 110b, 112b to the corresponding connections A, B of the drive motors 24, 26. The adjustment thereof again takes place via the control unit 38. In this case, the control pressures generated at the pilot control units 114, 116 are detected via pressure transducers 118 and converted into corresponding desired value signals which are applied to the input of the control unit 38. Then, in accordance with the previously described approach, the absorption volume of the drive motors 24, 26 is adjusted in dependence on said electric desired value signals and with the metering diaphragms 84a, 84b preset until the predetermined desired rotational speed ratio is set at the drive motors 24, 26.

A further difference over the solution described at the beginning consists in that the two outlet lines 96a, 96b of the two directional control valves 82a, 82b are connected to each other via a pressure-equalizing diaphragm 120—the latter ensures in the case of straight line travel that, when the straight line travel is preset, rotational speed differences resulting from manufacturing tolerances and setting tolerances are compensated for by the hydraulic coupling in the outlet. However, such a pressure-compensating diaphragm 120 has the disadvantage of further increasing the rotational speed differences during cornering if the loading is not symmetrical—for example during travel transversely with respect to the slope, but said deviations can be compensated for by appropriate control of the drive motors 24, 26.

The alternative illustrated in FIG. 4 has the advantage over the exemplary embodiment according to FIGS. 1 and 2 that if the electronics for setting the pivoting angle of the drive motors 24, 26 are switched off or have broken down, control can continue to take place in a conventional manner via the two directional control valve sections 48a, 48b. That is to say, even in the event of the electronics breaking down, the vehicle remains fully controllable—without this development the compact digger would remain stationary and would constitute a considerable obstacle, for example on the building site. Accordingly, in the exemplary embodiment according to FIG. 4, the advantages of a conventional hydraulic control are maintained, but, when the electronics are activated, the advantages can be used to improve the driving performance.

A hydraulic drive and a method for controlling such a drive are disclosed, wherein two drive motors are controllable via at least one continuously adjustable directional control valve. According to the disclosure, the two drive motors are designed as adjustable hydraulic machines.

The invention claimed is:

1. A hydraulic drive, comprising:
   two drive motors; and
   at least one directional control valve which is adjustable via at least one adjusting member in order to set movement parameters and via which the supply of pressure medium to and removal of pressure medium from the drive motors is settable,
   wherein the directional control valve is formed in a directional control valve section of a mobile control block having a plurality of control valve sections and configured to supply the two drive motors and a plurality of other hydraulic consumers,
   wherein each control valve section includes a continuously adjustable directional control valve with a metering diaphragm and a LUDV pressure balance arranged downstream of the metering diaphragm,
   wherein the two drive motors are of adjustable design and are adjustable by a control unit, the adjustment by the control unit depending on the actuation of the adjusting member, and
   wherein a common pump is assigned to the drive motors and to the plurality of the other hydraulic consumers.

2. The hydraulic drive as claimed in claim 1, wherein one directional control valve is assigned to the two drive motors.

3. The hydraulic drive as claimed in claim 1, wherein each drive motor is assigned a directional control valve.

4. The hydraulic drive as claimed in claim 3, wherein outlet lines from the directional control valves are hydraulically connected via a pressure-compensating diaphragm.

5. The hydraulic drive as claimed in claim 1, wherein the directional control valve is adjustable via the control unit.

6. The hydraulic drive as claimed in claim 1, wherein each drive is assigned an adjusting member.

7. The hydraulic drive as claimed in claim 1, wherein the adjusting member is an electronic adjusting member or a mechanical adjusting member, the adjustment of which is detected via sensors and is convertible into control signals for the control unit.

8. The hydraulic drive as claimed in claim 1, wherein, in a basic setting, the drive motors are set to a maximum delivery volume.

9. The hydraulic drive as claimed in claim 1, further comprising sensors configured to detect the rotational speed of the drive motors.

10. A method for controlling a drive, comprising:
  setting desired values for drive motors via an adjusting member;
  generating adjusting signals for at least one continuously adjustable directional control valve from the desired values and setting the directional control valve in accordance with said adjusting signals;
  determining a desired rotational speed ratio of the drive motors;
  comparing an actual rotational speed ratio with the desired rotational speed ratio; and
  adjusting the drive motors via the control unit until the desired rotational speed ratio is reached.

11. The method as claimed in claim 10, wherein the rotational speed ratio lies within the range of −1 to +1.

12. The method as claimed in claim 10, wherein the drive includes:
  two drive motors; and
  at least one directional control valve which is adjustable via at least one adjusting member in order to set movement parameters,
  wherein the two drive motors are of adjustable design and are adjustable by a control unit, the adjustment by the control unit depending on the actuation of the adjusting member.

13. A hydraulic drive, comprising:
  two drive motors; and
  at least one directional control valve which is adjustable via at least one adjusting member in order to set movement parameters,
  wherein the two drive motors are of adjustable design and are adjustable by a control unit, the adjustment by the control unit depending on the actuation of the adjusting member; and
  wherein one directional control valve is assigned to the two drive motors.

14. The hydraulic drive as claimed in claim 13, wherein the directional control valve is assigned an LUDV pressure balance.

15. The hydraulic drive as claimed in claim 13, wherein the directional control valve is adjustable via the control unit.

16. The hydraulic drive as claimed in claim 13, wherein each drive is assigned an adjusting member.

17. The hydraulic drive as claimed in claim 13, wherein the adjusting member is an electronic adjusting member or a mechanical adjusting member, the adjustment of which is detected via sensors and is convertible into control signals for the control unit.

18. The hydraulic drive as claimed in claim 13, wherein, in a basic setting, the drive motors are set to a maximum delivery volume.

19. The hydraulic drive as claimed in claim 13, further comprising sensors configured to detect the rotational speed of the drive motors.

20. A hydraulic drive, comprising:
  two drive motors; and
  at least one directional control valve which is adjustable via at least one adjusting member in order to set movement parameters,
  wherein the two drive motors are of adjustable design and are adjustable by a control unit, the adjustment by the control unit depending on the actuation of the adjusting member; and
  wherein the hydraulic drive further includes sensors configured to detect the rotational speed of the drive motors.

* * * * *